(12) United States Patent
Kanda et al.

(10) Patent No.: US 7,537,700 B2
(45) Date of Patent: May 26, 2009

(54) METHOD FOR REMOVING WATER CONTAINED IN SOLID USING LIQUID MATERIAL

(75) Inventors: Hideki Kanda, Kanagawa (JP); Hiromi Shirai, Kanagawa (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 410 days.

(21) Appl. No.: 10/516,160

(22) PCT Filed: Jun. 3, 2003

(86) PCT No.: PCT/JP03/06989

§ 371 (c)(1),
(2), (4) Date: Nov. 30, 2004

(87) PCT Pub. No.: WO03/101579

PCT Pub. Date: Dec. 11, 2003

(65) Prior Publication Data

US 2005/0210701 A1    Sep. 29, 2005

(30) Foreign Application Priority Data

Jun. 3, 2002    (JP)    ............................ 2002-161575

(51) Int. Cl.
*B01D 11/00*    (2006.01)
*F26B 3/00*    (2006.01)

(52) U.S. Cl. .......................... 210/634; 34/330; 34/337; 34/343; 95/254; 96/218; 44/280; 44/608; 44/626; 44/629; 210/180; 210/182; 210/202; 210/770; 210/774

(58) Field of Classification Search ......... 210/177–182, 210/195.1, 200–202, 259, 770, 773, 774, 210/805, 806, 634; 34/328–330, 337, 343; 159/47.1; 95/241, 254, 258; 96/155, 218; 44/280, 608, 620–626, 629; 60/39.01, 39.17, 60/39.52, 772, 781, 783; 237/12.1

See application file for complete search history.

(56) References Cited

U.S. PATENT DOCUMENTS 3,367,501 A * 2/1968 Eveson ........................ 209/467

(Continued)

FOREIGN PATENT DOCUMENTS

DE    450 659    10/1927

(Continued)

OTHER PUBLICATIONS

The Institute of Applied Energy, Prospect for New Energy, Low Grade Coal Upgrading Technology (1997).

(Continued)

*Primary Examiner*—Joseph W Drodge
(74) *Attorney, Agent, or Firm*—Notaro & Michalos P.C.

(57) ABSTRACT

A method and a system for removing water from high water content solid such as high water content coal, which enables dewatering with small energy consumption. A liquefied material which is a gas at 25° C. under 1 atm. (hereinafter referred to as material D) is contacted with a solid containing water to allow the liquefied material D to dissolve the water contained in the solid, and to produce a liquefied material D having a high water content and simultaneously remove the water from the solid, and by vaporizing the material D in the liquefied material having a high water content, to thereby separate the water from the resulting gaseous material D, recovering the separated gaseous material D, and liquefying the recovered gaseous material by pressurizing, cooling or a combination thereof, to reuse the resulting liquefied material for removing water from a solid containing water.

8 Claims, 4 Drawing Sheets

U.S. PATENT DOCUMENTS

| | | | |
|---|---|---|---|
| 3,454,095 A * | 7/1969 | Webster et al. | 166/303 |
| 4,185,395 A * | 1/1980 | Nakako et al. | 34/389 |
| 4,498,289 A * | 2/1985 | Osgerby | 60/39.52 |
| 4,733,478 A | 3/1988 | Kamei et al. | |
| 4,811,494 A | 3/1989 | Miller | |
| 5,346,630 A | 9/1994 | Kenney | |
| 5,379,902 A * | 1/1995 | Wen et al. | 209/166 |
| 5,458,786 A * | 10/1995 | Yoon et al. | 210/711 |
| 6,051,421 A * | 4/2000 | Sauer et al. | 435/283.1 |
| 6,098,306 A | 8/2000 | Ramsey et al. | |
| 6,526,675 B1 * | 3/2003 | Yoon | 34/424 |
| 6,855,260 B1 * | 2/2005 | Yoon | 210/727 |
| 7,416,137 B2 * | 8/2008 | Hagen et al. | 237/12.1 |

FOREIGN PATENT DOCUMENTS

| | | |
|---|---|---|
| EP | 03733265.7-2113 | 2/2008 |
| JP | 55-145506 | 11/1980 |
| JP | 56-067394 | 6/1981 |
| JP | 61-046202 | 3/1986 |
| JP | 8-173704 | 7/1996 |
| JP | 9-173845 | 7/1997 |
| JP | 9-173848 | 7/1997 |
| JP | 9-173863 | 7/1997 |
| JP | 9-286754 | 11/1997 |
| JP | 09-309850 | 12/1997 |
| JP | 9-309852 | 12/1997 |
| JP | 10-182535 | 7/1998 |
| JP | 10-195009 | 7/1998 |
| JP | 10-338653 | 12/1998 |
| JP | 11-130714 | 5/1999 |
| JP | 2000-290673 | 10/2000 |
| JP | 2002-143789 | 5/2002 |
| WO | WO 02/36720 | 5/2002 |

OTHER PUBLICATIONS

Allardice, D.J., et al., Fuel 50, "The-brown coal/water system: Part 2. Water sorption isotherms on bed-moist Yallourn brown coal", pp. 236-253 (1971).

Miura, Kouichi , et al., Fuel 81, "Dewatering of coal through solvent extraction", pp. 1471-1422.

Couch, Gordon R., IEA Coal Research, "Lignite Upgrading", IEACR/23, ISBN 92-9029-176-1, May 1990, pp. 25-72.

Allardice, D.J. et al., Proceedings of Pittsburgh Coal Conference, "Utilization of Low Rank Coals", Newcastle, Australia (2001), pp. 1-18.

Shigehisa, et al., Proc. ITB, "Development of UBS Process", vol. 32, No. 1, Bandung, Indonesia, Jul. 2-6, 2000, pp. 175-179.

Anderson, B., et al., International Coal Engineering Conference, "New Technologies for Producing Electricity from Brown Coal", Sydney, Jun. 1990, pp. 253-258.

Encoal Corporation, "Encoal Mild Coal Gasification Project: Encoal Project Final Report", DOE Instrument No. DE-FC21-90MC27339, Sep. 1997.

M.B. King, O.J. Catchpole, T.R. Bott: "Energy and economic assessment of near-critical process in Extraction" Icheme. Symposium Series, vol. 119, 1990, XP009070626, cost estimation for supercritical or near-critical solvent extraction p. 165-p. 166, p. 167, line 21-line 26; figures 1,3.

Reverchon E et al: "Comparison of Processes for the Supercritical Carbon Dioxide Extraction of Oil From Soybean Seeds" Journal of the American Chemists' Society, AOCS Press, Chamapaign, IL, US, vol. 71, No. 9, Sep. 1, 1994, pp. 1007-1012 XP000469678, ISSN: 0003-021X, p. 1010, col. 2- p. 1011, col. 1; Figure 7.

Yoshio Iwai, Michitaka Amiya, Tadaaki Murozono, Yasuhiko Arai, Kinya Sakanishi: "Drying of Coals by Using Supercritical Carbon Dioxide" Ind. Eng. Chem. Res., vol. 37, No. 7, 1998, pp. 2893-2896, XP002393409, abstract.

Partial English Translation of Office Action, Japanese Application No. 2004-508926, Date Mailed: Jan. 20, 2009.

* cited by examiner

METHOD FOR REMOVING WATER CONTAINED IN SOLID USING LIQUID MATERIAL

TECHNICAL FIELD

The present invention relates to dewatering from a solid containing water. More specifically it relates to a method and a system for dewatering from a solid containing water at an operating temperature near the outdoor air temperature with a small power consumption.

BACKGROUND ART

Heretofore, as a method for removing water from a solid containing water, a method for removing water by evaporating contained water has been used. Recently, however, a solvent replacement method in which water is removed with maintaining the liquid form of water without evaporation and not using latent heat of evaporated water has been attempted.

The method of removing water by evaporation includes, for example, a dewatering method using a dry inert gas as in Japanese Patent Laid-Open No. 10-338653. In this method, the difference between the saturated vapor pressure of water and the vapor pressure in the dry inert gas is used as a driving force. The theoretically maximum value of the amount of water that can be evaporated into dry inert gas is assumed to be proportional to the saturated vapor pressure of water, the density of steam and the volume of the dry inert gas. However, at about room temperature, the saturated vapor pressure of water is quite lower than 101325 Pa and the density of steam is extremely small compared with that of liquid water. Therefore, the inert gas dewatering device described in the publication of the Japanese Patent inevitably requires dewatering by a large volume of inert gas. It is possible to reduce the apparent volume by increasing the number of times of circulation, but the total amount of the gas processed is not very much reduced. This problem is also found in the case of solid as well as the case described in this publication where the dewatering target is liquid.

Regarding this problem, to solve the aspect that the saturated vapor pressure of water is quite lower than 101325 Pa at about room temperature, the method of reducing the amount of gas by heating dry inert gas to not less than 100° C. to increase the saturated vapor pressure of water to not less than 101325 Pa (hot air drying method) is used when the dewatering target is a substance that can be heated to not less than 100° C. However, the technique for evaporating water in a solid by the hot air drying method requires a heat source for heating the inert gas to not less than 100° C. and a heat source for evaporating water, and to remove water with a small energy, efficient recovery of the latent heat of evaporated water into the inert gas is important. However, the hot air drying method involves the problem that since the steam evaporated from the solid is diluted in the inert gas and the density of the latent heat of evaporated water remarkably decreases (the entropy increases), reduced recovery efficiency of the latent heat of evaporated water accompanying this is thermodynamically inevitable.

On the other hand, in the upgrading process of coal/oil slurry dewatering (Japanese Patent Laid-Open No. 2000-290673), coal is taken into consideration as a solid containing water and the solid containing water which has been slurried in oil is heated at not less than 150° C. to evaporate water in the solid containing water. Since only water is evaporated selectively due to the use of liquid oil as a heating medium which hardly evaporates at the operating temperature, the steam is not diluted and the density of the latent heat of evaporated water does not decrease. Therefore, the upgrading process of coal/oil slurry dewatering enables efficient recovery of the latent heat of evaporated water. Above all, for the dewatering of coal, the upgrading process of coal/oil slurry dewatering has the lowest energy consumption among the existing methods (The Institute of Applied Energy, Prospect for New Energy, Low Grade Coal Upgrading Technology (1997)). However, since the upgrading process of coal/oil slurry dewatering requires centrifugation and heating operation to separate solids and oil of the slurry after dewatering, it is necessary to introduce some energy. The energy consumption of the total process is 2100 kJ/kg-water (calculated from Table 5.29 relating to heat balance and mass balance, The Institute of Applied Energy, Prospect for New Energy, Low Grade Coal Upgrading Technology (1997)).

On the other hand, with coal as a solid containing water and for the purpose of not using latent heat of evaporated water, the solvent replacement method in which dewatering is performed without evaporating the water in the solid but with maintaining the liquid form (K. Miura, K. Mae, R. Ashida, T. Tamaura and T. Ihara, The 7th China-Japan Symposium on Coal and C1 Chemistry Proceedings p351 (2001)) has been attempted. The solvent replacement method includes two methods, one uses a nonpolar solvent and the other uses a polar solvent.

When a polar solvent is used, since the polar solvent has a high solubility in water even at room temperature and normal pressure, the water in the solid containing water can be dissolved without temperature increase. It is, however, necessary to conduct distillation to separate the polar solvent and water which have been completely mixed. This distillation procedure consumes an enormous amount of thermal energy and the energy for dewatering is considered to be replaced with the energy for distillation, which cannot be drastic measures for reducing the energy for dewatering.

On the other hand, the nonpolar solvent hardly dissolves water at room temperature. However, when the temperature is increased under high pressure without evaporating the nonpolar solvent while maintaining the liquid state, a trace amount of water is dissolved. Utilizing this characteristic, after dissolving water in the solid containing water into a nonpolar solvent at high temperature and high pressure, the nonpolar solvent is cooled to room temperature to separate water that cannot be dissolved in the nonpolar solvent. In this way, since water is removed without evaporation of water, the energy consumption can be further reduced but separation of solid containing water and liquid organic solvent is necessary, for which energy is required.

In this process, heating of the solvent and collection of heat released when cooling are necessary. As long as the heating tube and cooling tube for the solvent are linked via a heat exchanger, temperature increase at the heating side corresponding to the approach temperature of the heat exchanger is inevitable even in a hypothetical case of an ideal heating of solvent which does not take heat loss into consideration. This energy for heating is a product of the amount of the solvent, the approach temperature at the heat exchanger and the molar heat capacity of the solvent at constant pressure. As used herein, the approach temperature refers to the temperature difference set up between the cooling tube (high temperature medium) and the heating tube (low temperature medium) for conducting heat from the former to the latter in the heat exchanger.

The present inventors roughly calculated the energy consumption in the case of using tetralin as a nonpolar solvent in the above reference and obtained a value of 2284 kJ/kg-water.

In this calculation, from the point that the molar heat capacity at constant pressure of the solvent was not the value at an actual temperature of 145 to 150° C. but a small value at 25° C., and that the heat loss was not considered, the actual energy consumption would be greater than this. In the method of using tetralin, the energy consumption of heat exchange alone exceeded 2100 kJ/kg-water, which is the total energy consumption of the processes of the upgrading process of coal/oil slurry dewatering. Other than the heat exchange, energy for circulating solvent within the process is also necessary and even the method of using a nonpolar solvent cannot reduce the energy consumption for dewatering.

As described in the above conventional art, even the upgrading process of coal/oil slurry dewatering which has the minimum energy consumption requires heating in order to evaporate water from the solid containing water, and dewatering at a high temperature exceeding 100° C. is necessary, causing the problem of high cost of the devices and high running cost of the devices.

The present invention provides a method for dewatering with reduced energy consumption in which the cost of the devices and the running cost of the devices are reduced, by dewatering at a temperature condition near the outdoor air temperature, i.e., about 0° C. to 50° C. and efficiently recovering the chemical material used for dewatering, and a system for removing water which is excellent in heat exchange and recovery of work, and energy saving.

DISCLOSURE OF THE INVENTION

The present invention provides a method for removing water contained in a solid using a liquefied material, which comprises the steps of: contacting a solid containing water with a liquefied material which is a gas at 25° C. under 1 atm. (hereinafter referred to as material D) to allow the liquefied material D to dissolve the water contained in the solid, and to produce a liquefied material D having a high water content and simultaneously remove the water from the solid; vaporizing the material D from the liquefied material D having a high water content, to thereby separate the water from the resulting gaseous material D; recovering the separated gaseous material D; and liquefying the recovered gaseous material by pressurizing, cooling or a combination thereof, to reuse the resulting liquefied material for removing water from a solid containing water.

In addition, the present invention provides a system for removing water from a solid containing water comprises: a material which is a gas at 25° C. under 1 atm. (hereinafter referred to as material D), a compressor for pressurizing the gaseous material D, a condenser for condensing the pressurized gaseous material D to produce a liquefied material D, a dehydrator for dewatering by contacting the solid containing water with the liquefied material D to dissolve the water, a vaporizer for vaporizing the material D from the liquefied material D having the dissolved water, a separator for separating the vaporized material D and water, and an expander for expanding the vaporized material D, all of which are sequentially connected in series, wherein the expander is connected to the compressor to form a circuit in which the material D circulates, the condenser and the vaporizer are linked via a heat exchanger, and the work done in the expander on the outside is recovered and introduced as part of the power for the compressor. Here, a preferred set-up is that a deaerator for deaeration of material D from water separated in the separator is connected to the separator and to the circuit so that the gasified material D is recovered and returned to the circuit.

As the material which is a gas at 25° C. under 1 atm., at least one kind or a mixture of at least two kinds selected from dimethyl ether, ethyl methyl ether, formaldehyde, ketene and acetaldehyde is preferable. The contact between the liquefied material D and the solid containing water is not particularly limited, but counter flow contact is preferable. The amount of the liquefied material D to be brought into contact with the solid containing water is not particularly limited, but is preferably the theoretical amount from the viewpoint of preventing the components other than water from being extracted from the solid. The method for removing water of the present invention is suitable for removing water from a solid containing a large amount of water at an operating temperature near the outdoor air temperature with a small power consumption, and applicable to any solid containing water. The solid containing water is preferably brown coal or sub-bituminous coal, and the combustibility and the transportation cost comparable to that of high-grade coals can be achieved. In addition, remoistening of the brown coal or sub-bituminous coal dewatered according to the present invention is suppressed and therefore, taking measures for remoistening such as addition of heavy oil is unnecessary.

According to the present invention, since a liquefied material which has a high mutual solubility with water and which is a gas under atmospheric pressure at a temperature near the outdoor air temperature is used as a dewatering medium, the liquefied material can be easily separated from water by evaporation after dewatering, enabling dewatering at an operating temperature close to the outdoor air temperature compared to the conventional technique. In addition, evaporation for water separation is not necessary and the recovery of the latent heat of evaporated water is not needed at all, thereby enabling energy-saving dewatering. Furthermore, the liquefied gas can be efficiently recovered for recycling, and in the system, the latent heat of vaporization is recovered by a heat exchanger, and the work due to expansion can be efficiently recovered, achieving further energy saving. In other words, according to the present system, by slightly changing the temperature and the pressure after eluting the water contained in coal into liquefied dimethyl ether, only dimethyl ether is selectively evaporated from the mixture of liquefied dimethyl ether and water to easily perform separation of water and dimethyl ether. At the same time, water is removed from coal without evaporation of water and the evaporated dimethyl ether is liquefied for recycling.

In addition, by deaeration of the separated waste water, the liquefied material can be easily removed, and the burden on the environment is lessened.

BEST MODE FOR CARRYING OUT THE INVENTION

Figure 1:
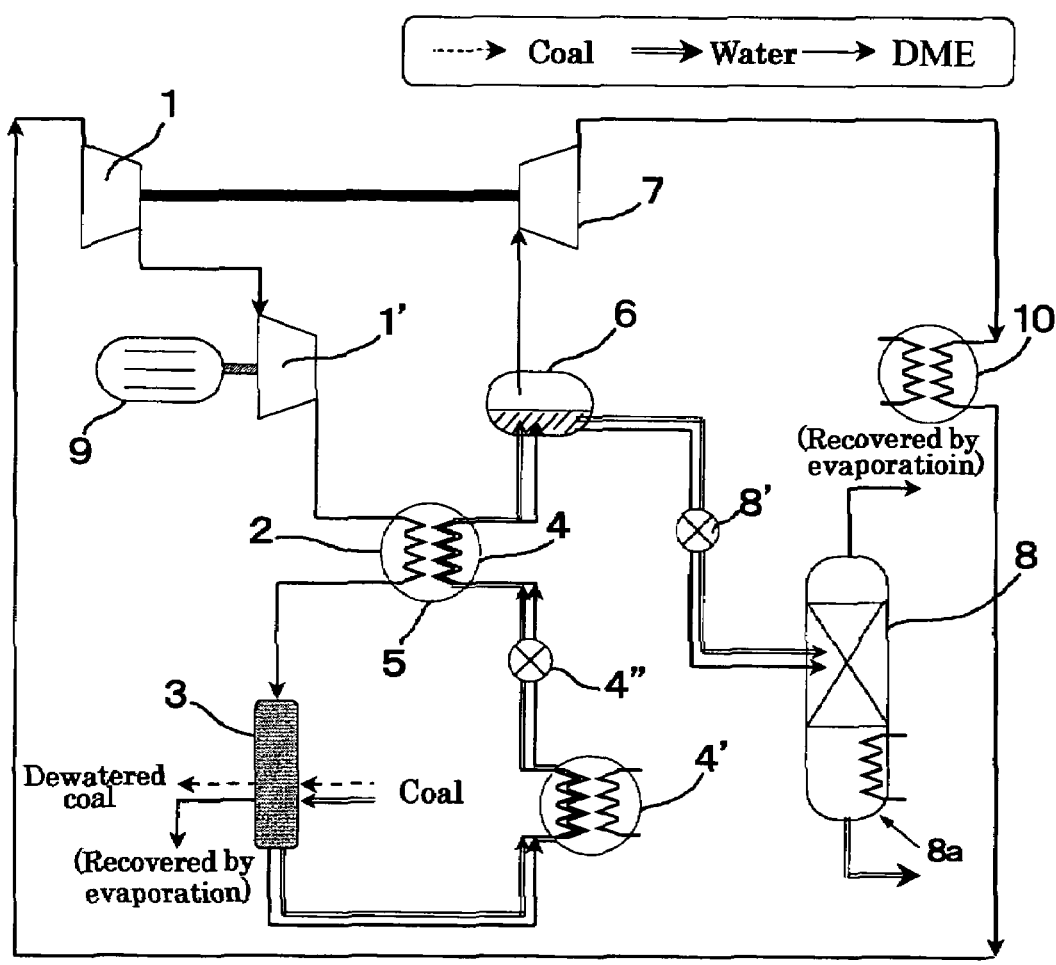
FIG. 1 is a schematic view of an embodiment of the system of the present invention.

In the present invention, a liquefied material which is a gas at 25° C. under 1 atm is used for removing water as liquid to be brought into contact with a solid containing water.

In the solvent replacement method using a non-polar solvent which is one of the conventional water removing methods, the characteristic that the solubility in water increases by heating the solvent is utilized. In order to achieve energy saving in the solvent replacement method, the characteristic of the present invention is to change the solubility in water remarkably by utilizing the vapor-liquid phase transition phenomenon of the solvent. That is, the material which is a gas at room temperature is liquefied by pressurization or cooling and the liquefied material is used as a replacement solvent. When the temperature and the pressure are slightly changed after dissolving water in the solid into the liquefied solvent, the solvent is selectively evaporated, enabling easy separation of water and the gaseous solvent.

Accordingly, the solvent to be used in the present invention is preferably a substance high in mutual solubility with water and high in mutual solubility with water in the form of liquid.

A boiling point of the solvent higher than the room temperature is not preferable, because a high temperature energy source is necessary for evaporating the solvent when separating from water, and the energy required for dewatering is expected to increase. To achieve dewatering at a low energy consumption, the boiling point of the solvent is preferably around or not more than the room temperature. In view of this, a material which is a gas at 25° C. under 1 atm. is liquefied and used in the present invention. More preferred is a material which is a gas at 0° C. under 1 atm. Examples of the material which is a gas at 25° C. under 1 atm. are dimethyl ether, ethyl methyl ether, formaldehyde, ketene and acetaldehyde. These can be used alone or in a mixture of two or more kinds. Of these, preferred are dimethyl ether and dimethyl ether which is nontoxic and easy to handle. In addition, the material which is a gas at 25° C. under 1 atm. also includes butane and propane. These are not capable of dissolving water alone but can be mixed with at least one kind or a mixture of at least two kinds selected from dimethyl ether, ethyl methyl ether, formaldehyde, ketene and acetaldehyde. Since butane and propane constitute natural gas, they are readily available and liquefiable as they have a boiling point close to that of the liquefied dimethyl ether. In addition, even if they are mixed with liquefied dimethyl ether, properties sufficiently superior to that of the existing methods can be achieved, though dewatering property slightly decreases and therefore, the amount of liquefied dimethyl ether to be used can be reduced.

In the method of the present invention, such liquefied material is brought into contact with a solid containing water to allow contact with water in the solid, namely, water on the surface of the solid, between the solid particles or in some cases, water present in micropores inside the solid particles, and water in the solid containing water is dissolved in the liquefied material to remove water from the solid containing water. The method of contact may be any method used for usual dewatering, such as immersion and flowing the liquefied material through the solid.

From the liquefied material with increased water content, water can be easily separated therefrom by evaporating only the liquefied material. The evaporation can be carried out by increasing temperature and/or pressure. Since the liquefied material used in the present invention is a material which is a gas at a temperature near the outdoor air temperature, heating for evaporation is basically not necessary and the material can be evaporated at around room temperature, depending on the pressure during the evaporation. The temperature for evaporation is preferably 0° C. to 50° C., depending on the kind of the liquefied material to be used. The pressure of the liquefied material when evaporating is consequently determined based on this temperature. The evaporated liquefied material is recovered, liquefied and brought into contact with a solid containing water again to be used for removing water. The material is liquefied by pressurization, cooling or combination of pressurization and cooling, and advantageous conditions are accordingly selected in consideration of the boiling point of the material to be used. When using a material having a boiling point of not more than 0° C. under 1 atm. and if it is liquefied only by cooling without pressurization, the temperature of the liquefied material becomes 0° C. or lower, and dewatering becomes impossible. From this, it is necessary to liquefy at a temperature higher than 0° C. and liquification is carried out by combining pressurization and cooling. In the case of a material having a boiling point exceeding 0° C. under 1 atm., liquification is preferably performed at a temperature not lower than the boiling point. This is because when the temperature is not more than the standard boiling point, the saturated vapor pressure of the material D is less than 1 atm., and this causes the pressure inside the device to become less than 1 atm., resulting in increase in the production cost of the device and difficulty in handling. The temperature of the liquefied material is preferably 0° C. to 50° C., and this determines the pressure. From the foregoing, in the method of the present invention, a series of dewatering processes can be carried out at a temperature range of about 0° C. to 50° C. by changing the pressure and the temperature, achieving dewatering with a small energy.

The method of the present invention can be applied to removal of water from any solid including coal.

Since liquid is used as a medium for dewatering in the method of removing water of the present invention, the driving force for dewatering is the difference between the saturation solubility of water in the liquefied material and the concentration of water in the liquefied material. The theoretically maximum value of the content of water that can be dissolved in the liquefied material is proportional to the saturation solubility of water, the density of water and the volume of the liquefied material. When this is compared with the maximum theoretically value of the content of water that can be evaporated into dry inert gas as mentioned in the section of the Background Art, the saturation solubility of water is about 6% at around 20° C., which is extremely higher than the partial pressure of the saturated vapor pressure of water in the air at the same temperature (about 2%). Such extremely high mixing ratio is impossible in the case of a gas, and this is the distinguishing characteristic of using liquid as a dewatering medium. In addition, since the density of water is extremely greater than the density of steam, dewatering can be performed with a small amount of liquefied material.

In addition, when dewatering by dry inert gas, the steam mixed in the gas is diluted and therefore, the density of the latent heat of evaporated water becomes small, making it difficult to recover the latent heat of evaporated water. For practical application of dewatering processes for a great amount of substances, efficient recovery of the latent heat of evaporated water is crucial, and a dewatering method using a gas as a medium is limited to small-scale processes.

However, when liquid is used as a dewatering medium as in the present invention, removal can be realized without vaporization of water and recovery of the latent heat of evaporated water itself is not needed at all. In addition, because the material is a gas in the vicinity of the outdoor air temperature at normal pressure, separation of the liquefied material and water is easy, enabling energy-saving dewatering.

The dewatering system suitable for practicing the method for removing water of the present invention is shown below. FIG. 1 is a schematic view showing a constitution of an embodiment of the system for removing water of the present invention.

In this embodiment, dimethyl ether is used as the material D which is a gas at 25° C. under 1 atm. and dewatering of coal as a solid containing water is illustrated, but the system of the present invention is not limited to this. Dimethyl ether has a boiling point of about −25° C. under 1 atm. and is in the gas state at 0° C. to 50° C. under atmospheric pressure. Since dimethyl ether is in the form of gas at about room temperature under atmospheric pressure, operation under pressurization is necessary to obtain liquid dimethyl ether. Highly efficient methods of producing dimethyl ether and the production apparatuses thereof are disclosed, for example, in Japanese Patent Laid-Open No. 11-130714, Japanese Patent Laid-Open No. 10-195009, Japanese Patent Laid-Open No. 10-195008, Japanese Patent Laid-Open No. 10-182535 to Japanese Patent Laid-Open No. 10-182527, Japanese Patent Laid-Open No. 09-309852 to Japanese Patent Laid-Open No. 09-309850, Japanese Patent Laid-Open No. 09-286754, Japanese Patent Laid-Open No. 09-173863, Japanese Patent Laid-Open No. 09-173848 and Japanese Patent Laid-Open No. 09-173845, and it can be obtained easily.

Compressors 1, 1' for pressurizing vapor of dimethyl ether, a condenser 2 for liquefying the pressurized vapor, a dehydrator 3 for dewatering by contacting liquefied dimethyl ether with water in the solid containing water to dissolve water and a vaporizer 4 for evaporating dimethyl ether from liquefied dimethyl ether containing water due to dewatering are connected in the mentioned order. The condenser 2 and the vaporizer 4 are linked via a heat exchanger 5. Next to the vaporizer 4, a separator 6 for separating vapor of dimethyl ether and water and an expander 7 for adiabatic expansion of the vapor of dimethyl ether separated in the separator 6 are connected in series by a pipe, and the expander 7 is further connected to the compressor 1, forming a closed circuit (circulation path). Dimethyl ether circulates through this circuit changing its state from gas to liquid or otherwise, where dewatering and separation of water are repeated. In FIG. 1, reference numeral 4' denotes a cooler and reference numeral 4" denotes a pressure reducing valve, which are used for controlling the temperature and the pressure when evaporating liquefied dimethyl ether and considered as part of vaporizer. A degasifier 8 for gasifying dimethyl ether dissolved in water separated in the separator 6 is connected to the separator 6. In the degasifier 8, dimethyl ether is evaporated and recovered by reducing the pressure inside the degasifier by a pressure holding valve 8'. The degasifier 8 is connected to the aforementioned circuit and the recovered dimethyl ether is returned to the circuit through a pipe which is not shown in the figure.

Expander 7 recovers work produced there and the work is utilized as part of the power for the compressor 1 which pressurizes dimethyl ether. In the system of FIG. 1, the compressor was in two-step and the first compressor 1 and the expander 7 are connected to recover the work done in the expander 7, which is used as the power for the first compressor 1. Reference numeral 9 denotes a motor and the work is introduced to only the second compressor 1'. By the work for the external field at the expander 7 is generally meant what is generated due to the volume expansion of dimethyl ether gas, but the work described in the following is also included. Superheated dimethyl ether gas released from vaporizer 4 may contain droplets involved in the flow of the superheated gas. Therefore, in the expander 7, work due to evaporation of the mixed droplets can be obtained as well. In the present invention, the work done at the expander 7 includes this work as well as those generated by the volume expansion of superheated gas.

Since the condenser 2 and evaporator 4 are linked via the heat exchanger 5, the latent heat of the evaporated liquefied dimethyl ether is recovered and efficiently used.

In addition, a cooler 10 may be set up in the system of the present invention as shown in FIG. 1. This is installed according to need depending on the condition of the liquefied gas to be used and regulates the temperature of the gas released from the expander 7 to the optimal temperature at the entrance of the compressor 1.

The present system involves three elements, i.e., coal, which is a solid containing water, water and liquefied dimethyl ether. The flow of the present system is described focusing on each material.

The dehydrator 3 is filled with coal which is a solid containing water and the coal is collected from the column after dewatering by liquefied dimethyl ether. In FIG. 1, the dotted line denotes the flow.

The flow of water is represented by a double line in FIG. 1, and water in the solid containing water is supplied from the dehydrator 3 to the system. This water is first dissolved in liquefied dimethyl ether in the dehydrator 3 and arrives at the vaporizer 4, being dissolved in the liquefied dimethyl ether. In vaporizer 4, most of the liquefied dimethyl ether is evaporated and water dissolved in the liquefied dimethyl ether is separated. In vapor-liquid separator 6, vapor of dimethyl ether and water are separated from each other, and water remains as waste water. Since the pressure inside the vapor-liquid separator 6 is higher than the atmospheric pressure, dimethyl ether gas is dissolved in the water phase separated in the vapor-liquid separator 6. Direct discharge of this water imposes a heavy burden on the environment and increases the loss of dimethyl ether. To minimize the burden on the environment and the loss of dimethyl ether, it is necessary to recover dimethyl ether by setting a degasifier for dimethyl ether. In this embodiment, the degasifier 8 is used as the degasifier for dimethyl ether, which is designed to recover dimethyl ether by installing a pressure holding valve 8' at the entrance to reduce the pressure inside the degasifier 8. Furthermore, by heating water by heating can 8 a provided at the bottom of the degasifier 8, the recovery ratio of dimethyl ether can be improved. The gasified water is exhausted as a bottom liquid, while the vapor of dimethyl ether separated from the waste water can be returned to the circuit of the dewatering system for reuse.

The flow of dimethyl ether gas is shown by a solid line in FIG. 1 and after pressurized into superheated gas at compressors 1 and 1', dimethyl ether is formed into supercooled liquid at condenser 2. The supercooled liquid of liquefied dimethyl ether is supplied to dehydrator 3 and dissolves water in the solid containing water and transferred to vaporizer 4. The liquefied dimethyl ether is separated from water at the vaporizer 4 and returns to superheated gas. At this stage, since the condenser 2 and the vaporizer 4 are linked via heat exchanger 5, the latent heat of the evaporated liquefied dimethyl ether is recovered and efficiently used. The superheated dimethyl ether gas released from the vaporizer 4 produces work at the expander 7, which is collected as part of the power for the compressor. The dimethyl ether gas from the expander 7 is transferred to the compressor 1 again to circulate within the system.

Figure 2:
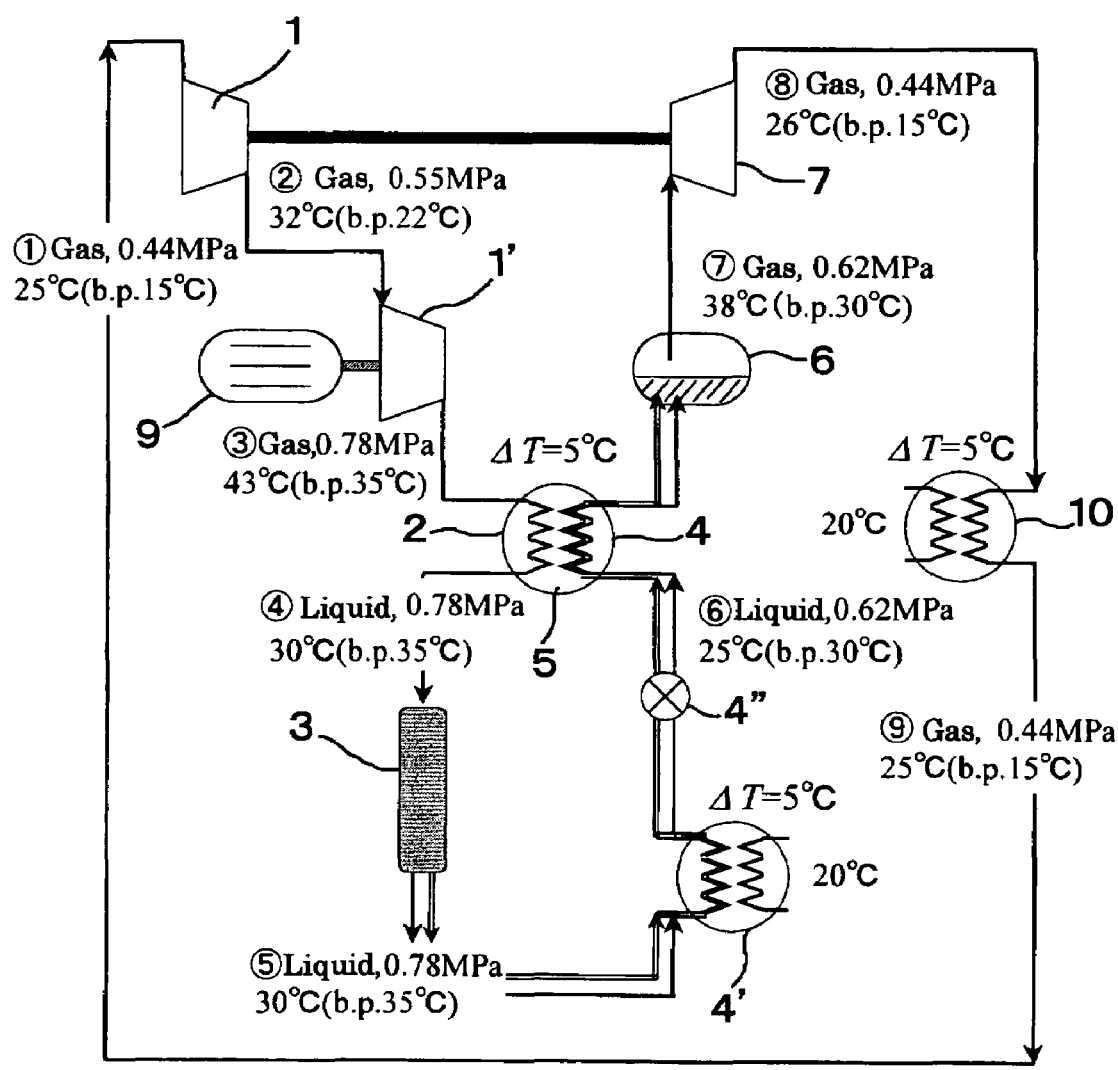
FIG. 2 is a schematic view of the temperature and pressure conditions in an embodiment of the system of the present invention.

FIG. 2 shows an example of setting of phases, pressure, temperature and saturated temperature in the case of using dimethyl ether in an embodiment of the system of the present invention. To simplify the setting of the pressure and the temperature, deaerator 8 for deaeration of dimethyl ether from water is omitted, assuming that complete separation of water and dimethyl ether is possible at the vapor-liquid separator 6. It is also assumed that the solid containing water treated in the dehydrator 3 does not contain dimethyl ether.

First, the conditions of temperature and pressure are determined based on the temperature at the entrance of the first compressor 1. The pressure is 0.44 MPa when the temperature at the entrance ① of the first compressor is 25° C., which is superheated by 10° C. from the saturated temperature (b.p. 15° C.). The smaller the degree of superheat, the higher the pressure at the first compressor 1, causing reduction of the power at the compressor 1. At the same time, however, the risk of condensation of the dimethyl ether gas by the external air at the stage prior to the entrance 1 of the compressor increases. In addition, since the thermal capacity ratio of dimethyl ether is as small as 1.11, the temperature is difficult to increase during adiabatic compression. Therefore, the degree of superheat at each exit ② and ③ of the first compressor 1 and the second compressor 1' is smaller than the degree of superheat at the entrance of the compressor. In the present system, attention should also be paid to the degree of superheat at the exits of the compressors when determining the degree of superheat at the entrances of the compressors.

The pressure at the exit ③ of the second compressor 1' is determined based on the temperature of the cooling water used in cooler 4' in front of the vaporizer 4. Here, the outdoor air temperature is assumed to be 20° C. and the temperature of the cooling water is assumed to be equal to the outdoor air temperature. When the approach temperature at cooler 4' is 5° C., the temperature of dimethyl ether at the exit ⑥ of the cooler 4' (entrance of the vaporizer) is 25° C. Further, when the approach temperature for the condenser 2 and the vaporizer 4 is 5° C., the temperature at the exit ④ of the condenser 2 is 30° C. When a degree of supercooling of 5° C. is set at the exit of the condenser 2 (entrance of dehydrator 3 and in dehydrator 3) for dimethyl ether to be stable as liquid in the dehydrator 3, the operating pressure of the condenser 2 (pressure at the exit of the compressor) is determined. In this case, since the saturation temperature is 35° C., the pressure at the exit ④ of the condenser 2 and exit ③ of the compressor 1' (entrance of condenser) is 0.78 MPa. When adiabatic compression is assumed, the temperature at exit ③ of the second compressor 1' is 43° C., which is confirmed to be higher than the saturation temperature of dimethyl ether at the exit of the compressor.

Since the saturation temperature at the vaporizer 4 is 30° C., it is necessary to reduce pressure to the saturation pressure at 30° C. at the entrance ⑥ of the vaporizer 4. The saturation pressure used here means the saturation pressure of a mixture of liquefied ether and water, and is 0.62 MPa. The temperature difference ΔT between the condenser 2 and the vaporizer 4 is 5° C., the temperature at the exit ⑦ of the vaporizer 4 (entrance of the expander) is 38° C. The degree of superheat at this point is 8° C., and so the heat loss within the range of energy required for heating dimethyl ether gas by 8° C. is tolerable in the section from the exit of the second compressor 1' to the entrance of the expander 7.

After separating dimethyl ether gas at the vapor-liquid separator 6, adiabatic expansion is carried out in the expander 7. The pressure at the exit ⑧ of the expander 7 is equal to the pressure at the entrance of the first compressor 1. Due to the adiabatic expansion, the dimethyl ether gas is cooled to 26° C. Since the temperature is 1° C. higher than the temperature at the entrance of the first compressor 1, cooling is necessary. At the expander 7, energy is recovered and used as the power for the first compressor. When the adiabatic efficiency at the expander 7 and the first compressor 1 is assumed to be 80%, the temperature is determined to be 32° C. and the pressure is determined to be 0.55 MPa at the exit of the first compressor.

Further, by changing the adiabatic efficiency at the expander 7 and the two compressors 1 and 1' in several ways according to the settings of the previously determined temperature and pressure, the power consumption at the second compressor 1' is calculated.

First, the total work necessary for the two compressors 1 and 1' is (theoretical work required for two compressors 1 and 1')÷(adiabatic efficiency). On the other hand, the work recovered by the expander 7 and introduced as the power for the first compressor 1 is (theoretical work by expansion)×(adiabatic efficiency). Accordingly, the work required for the second compressor 1' is (theoretical work required for the two compressors 1 and 1')÷(adiabatic efficiency)−(theoretical work by expansion)×(adiabatic efficiency). Further, since the work needs to be introduced in the form of power, the total energy required for the second compressor 1' is (work required for second compressor 1')÷0.35, where the conversion efficiency is 0.35. The conversion efficiency is the same as the conversion efficiency of compression power for recovery of the latent heat of evaporated water used in the calculation of power in the upgrading process of coal/oil slurry dewatering.

Figure 3:
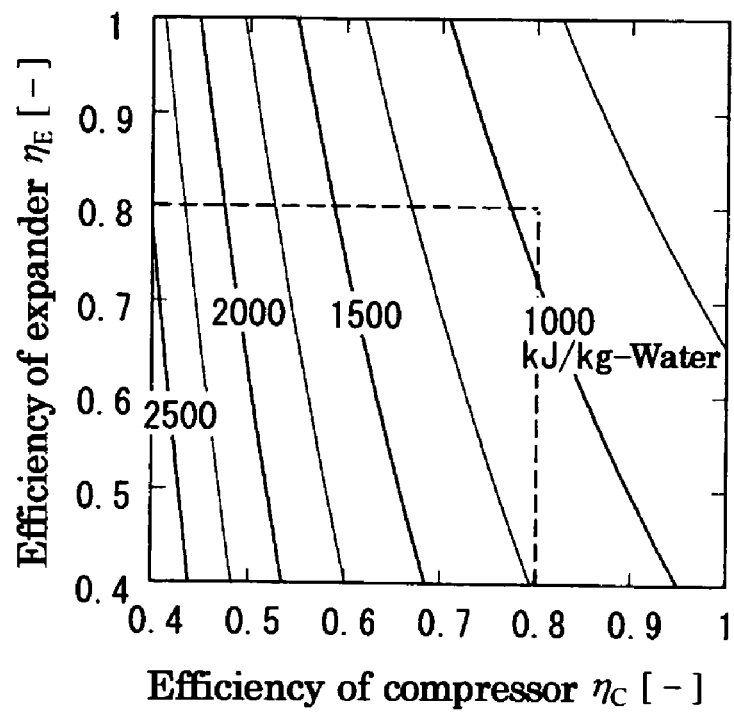
FIG. 3 is a graph illustrating the power necessary for the second compressor relative to the adiabatic efficiency of the expander and the adiabatic efficiency of the compressor.

Here, when dimethyl ether is approximated to an ideal gas, assuming adiabatic compression, the power required for the second compressor 1' can be obtained relative to the adiabatic efficiency of the expander 7 and the adiabatic efficiency of the compressor 1 as shown in FIG. 3.

When the adiabatic efficiency of the compressor 1 and the adiabatic efficiency of the expander 7 are 0.8, respectively, the power consumption of the present system is 948 kJ/kg-water. The compression efficiency is the same as the compression efficiency of the compressor for recovery of the latent heat of evaporated water used in the calculation of the power in the upgrading process of coal/oil slurry dewatering (The Institute of Applied Energy, Prospect for New Energy, Low Grade Coal Upgrading Technology (1997)).

As shown in the calculations, it has been theoretically confirmed that dewatering with small energy consumption, which is the problem to be solved by the invention, can be achieved.

EXAMPLE 1

Figure 4:
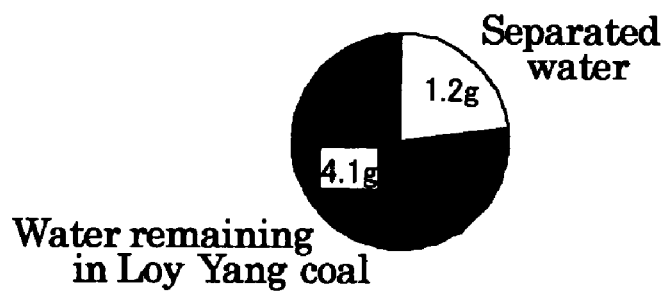
FIG. 4 is a view showing the result of the dewatering experiment.

The following experiment corresponding to the method for removing water of the present invention has been carried out. Australian Loy Yang coal, which is brown coal, was used as a solid containing water. To achieve an extremely high water content of not less than 60%, after reducing the pressure of the Loy Yang coal immersed in pure water by an aspirator to replace the air in the micropores with water, the Loy Yang coal was subjected to sufficient draining and sample coal was prepared. The wet weight of the sample coal was 5.9 g (dry weight 1.8 g, weight of water 4.1 g). Then, a transparent container previously cooled to −75° C. was charged with the moistened Loy Yang coal and 55.0 g of liquefied dimethyl ether (hereinafter abbreviated as DME) (purity: not less than 99%). The whole container was sunk in a thermo bath and stood still for an hour at a constant temperature of 30° C. to contact Loy Yang coal with liquid DME. Subsequently, when DME in the container was evaporated under atmospheric pressure, 1.2 g of water was separated from the Loy Yang coal on the bottom of the container. The result is shown in FIG. 4.

The amount of the separated water was 29 wt % of the water content of Loy Yang coal before treatment. In this way, it was confirmed that water could be easily removed at a temperature condition near the outdoor air temperature using liquid DME.

EXAMPLE 2

Figure 5:
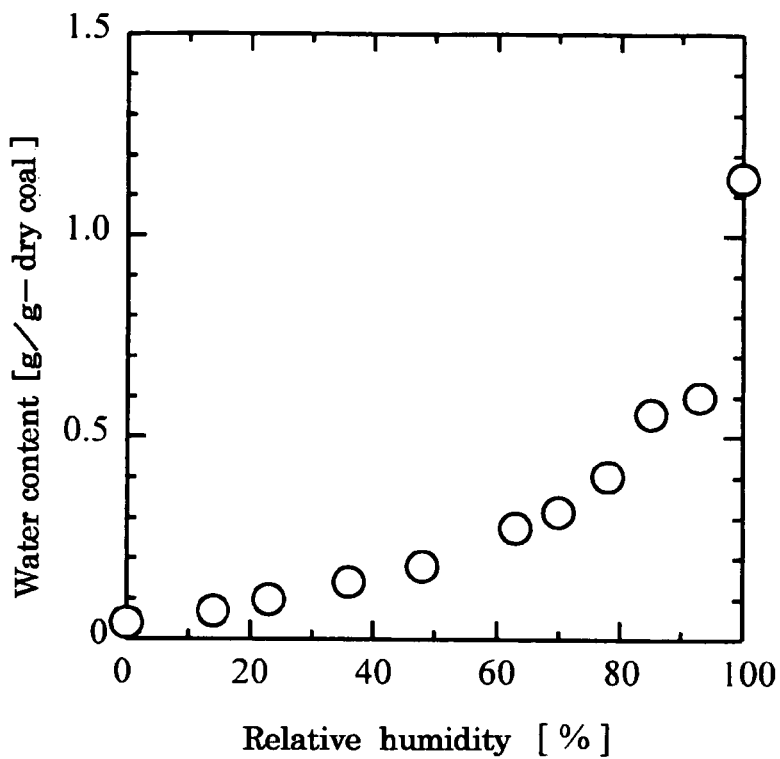
FIG. 5 is a graph illustrating the relation between the water content of Loy Yang coal and the relative humidity.

Using Australian Loy Yang brown coal (ash content 0.3 wt %, water content 53.2 wt %, volatile component 27.1 wt %, carbon 19.3 wt %) and liquid DME, dewatering phenomena, water content of dewatered coal, dewatering performance, separated combustible portions and remoistening characteristic of dewatered coal were revealed. For reference, to dry Loy Yang coal at the level of bituminous coal, drying at a humidity of about 10% is necessary as is clear from the adsorption isotherm at 25° C. of steam for Loy Yang coal as shown in FIG. 5. As described above, dewatering of Loy Yang coal is extremely difficult. This is because brown coal contains bulk water condensed on the surface of brown coal particles or between particles, and surface adsorbed water of brown coal and capillary condensed water inside the micropores of brown coal. Of these, it is easiest to remove bulk water, and regarding capillary condensed water, the strength to maintain water is high due to strong capillary suction. Surface adsorbed water means water directly adsorbed on the micropore wall surfaces of brown coal, which is the most difficult to remove.

1. Experiment Method

In order to use Loy Yang coal in the experiment after adjusting the water content to a fixed value, the Loy Yang coal was placed on the upper part of a container with water placed underneath, and the container was sunk in a thermo bath to moisten the Loy Yang coal at a temperature of 25° C. under a relative humidity of 100% for at least one day. The water content of the moistened Loy Yang coal was within the range of 52±2%, with some differences in each experiment. To note, the Loy Yang coal obtained was in the form of particles having a particle size of not more than 5 mm and used for the experiment in the form of particles.

The dewatering experiment was conducted by pushing out and passing liquid DME filled in a stainless-steel container by compressed nitrogen of 0.7-0.9 MPa. through a column filled with Loy Yang coal which has a fixed water content and a particle size of not more than 5 mm, and then collecting liquid DME in a sealed empty container connected to the rear side of the column for storing liquid DME. Dewatering is achieved when water in the Loy Yang coal is dissolved in liquid DME passing through the column.

The experiment was conducted under room temperature and the flow rate of liquid DME was 10 ml/min. The purity of the liquid DME employed in the experiment was not less than 99%. The saturated vapor pressure of the liquid DME at 20° C. was 0.51 MPa. The saturation solubility of water to liquid DME at 20° C. was 6.7 wt %. The minimal amount of DME necessary for dissolving 1 g of water (hereinafter referred to as "theoretical amount") is 14.9 g.

2. Dewatering Phenomena

Dewatering experiment in which the theoretical amount (194 wt %) of liquid DME was passed through a column was conducted to clarify the characteristics of the dewatering phenomena.

As a result of passing the liquid DME, the volume of the obtained dewatered coal was about 70% of that before dewatering. In addition, when the dewatered coal was heated at 107° C., the weight was decreased and upon measurement of the components of the evaporated gas by gas chromatography, a large amount of DME was detected. This revealed that a large amount of DME was adsorbed to the dewatered coal. Liquid DME itself, however, is a fuel and even if remained in the coal, it causes little problem when burning the coal.

The liquid DME released from the column was brown, semi-transparent, and part of the combustible portions of Loy Yang coal was considered to be dissolved in the liquid DME. The liquid DME was evaporated and the impurities contained in the obtained DME gas were analyzed through gas chromatography. As a result, other than the DME gas, only small amounts of steam and nitrogen were detected as impurities. This confirmed that the evaporated DME contained almost no impurity and thus reusing of DME was possible.

Moreover, after evaporating the liquid DME released from the column, opaque brown waste water and brown solid (hereafter referred to as "separated portions"), which was considered to be part of the combustible portions of brown coal, were separated. The separated portions were soluble in ethanol and combustible.

3. Water Content of Dewatered Coal and Mass Balance Before and after Dewatering

From the above-mentioned dewatering experiment, the amount of water removed from coal, i.e., the weight of removed water was 4.23 g. Here, as for the measurement of the water content of Loy Yang coal before dewatering, the water content of the dewatered coal alone cannot be measured by a usual method of measuring water content because DME adsorbed to the dewatered coal evaporates at 107° C. In view of this, calculation was carried out using the water content (53.2%) of the same lot of Loy Yang coal that had undergone the same moistening operation. The calculated water content of Loy Yang coal before dewatering was 4.43 g. Hence, the difference of 0.20 g was assumed to be water contained in the dewatered coal. Consequently, it was revealed that the water content relative to the total weight of dewatered coal of 4.74 g was 4.3% and that Loy Yang coal was able to be dewatered to the level of bituminous coal.

Moreover, the total weight of the dewatered coal, removed water and separated portions was 9.43 g and was 1.11 g heavier than the wet weight of Loy Yang coal before dewatering, which was due to DME adsorbed to the dewatered coal. Of these, from the fact that the decrease in weight after heating the dewatered coal at 107° C. for an hour was 0.59 g and the remaining 0.52 g did not evaporate, it was revealed that about half of the adsorbed DME is closely bonded to Loy Yang coal.

The weight of the separated portions was 12 wt % of the dry weight of Loy Yang coal before dewatering. When the removed water was evaporated by heating, brown solid that corresponded to a concentration of 1500-2000 ppm was separated.

4. Dewatering Performance

Figure 6:
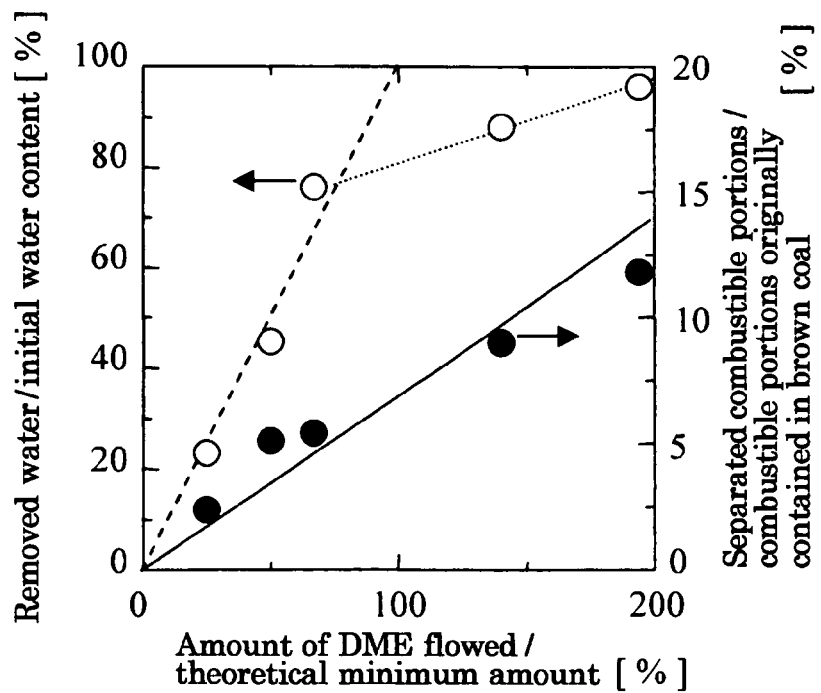
FIG. 6 is a graph illustrating the relation between the flowing amount of liquefied dimethyl ether, the amount of removed water and the separated amount of combustible portion of brown coal.

Next, dewatering experiments of Loy Yang coal were carried out while varying the flowing amount of liquid DME. The results are shown in FIG. 6. The amount of removed water on the ordinate is normalized by the amount of water contained in Loy Yang coal before dewatering while the flowing amount of liquid DME on the abscissa is normalized by the theoretical amount. The broken line in the figure denotes the amount of removed water when water in brown coal is dissolved in liquid DME to be saturated.

As shown in FIG. 6, in the case that the flowing amount of liquid DME was small and dewatering from Loy Yang coal has not been progressed, water in brown coal was dissolved in liquid DME to be saturated, and the maximum amount of water in coal was removed relative to the flowing amount of the liquid DME. This may be because bulk water, which is easy to be removed, of the water contained in Loy Yang coal dissolved in liquid DME.

When the flowing amount of liquid DME was increased, the removed water increased in proportion to the flowing amount of liquid DME until about 80 wt % of the initial water content of Loy Yang coal was removed. At the point where about 80 wt % of the initial water content of Loy Yang coal was removed, the amount of liquid DME required for dewatering rapidly increased. This was because liquid DME is not saturated in water but released from the column and about six times the theoretical amount of liquid DME was required (dotted line). This seemed to be because capillary condensed water or adsorption water remained inside the micropores of Loy Yang coal and the concentration of water in the liquid DME in equilibrium with such water was low.

In this way, at the initial stage of dewatering where Loy Yang coal contains rich bulk water, liquid DME that already contains a large amount of water can be used for dewatering, because the liquid DME can dissolve the amount of water to be saturated. On the other hand, when dewatering of Loy Yang coal has progressed and only capillary condensed water or adsorption water remains, it is necessary to use liquid DME having a low water concentration. This reveals that when a counter flow contact dewatering device is employed, dewatering can be achieved to the level of bituminous coal while retaining the flowing amount of liquid DME to the theoretical amount.

5. Separated Combustible Portions

In FIG. 6, the relation between the flowing amount of liquid DME and the amount of separated portions is also described (symbol ●). The weight of the separated portions on the ordinate is normalized by the dry weight of Loy Yang coal before dewatering (the weight of combustible portion). As shown in FIG. 6, in order to increase dewatering ability, it is desirable that the amount of liquid DME is higher than the theoretical amount. However, since the weight of the separated portions is proportional to the flowing amount of DME, it is preferable to carry out dewatering using a theoretical amount of liquid DME in order to prevent the combustible portion of Loy Yang coal from decreasing. This also suggests that counter contact of Loy Yang coal and liquid DME is preferable.

6. Re-Moistening Characteristic of Dewatered Coal

Dewatered coal was left in an atmosphere of a temperature of 25° C. and a relative humidity of 80% for 24 hours. The water content increased only up to 7.1% after 24 hours. As shown in FIG. 2, from the fact that moistening to a water content of 29% occurred when Loy Yang coal before dewatering was left at a temperature of 25° C. under an atmosphere of a relative humidity of 78% for 24 hours, it was clarified that the re-moistening of the dewatered coal was suppressed.

The reason for this is that for the dewatered coal to be re-moistened, water molecules need to be dissolved in the DME molecule groups adsorbed on the surface of the dewatered coal. As described above, since the saturation solubility of water for liquid DME is about 6.7 wt %, water does not dissolve exceeding the saturation solubility, and as a result, it is considered that the re-moistening of dewatered coal is suppressed.

Thus, while existing methods require measures such as addition of heavy oil for suppressing re-moistening, the method of the present invention has an advantage that no special measures are needed for preventing re-moistening.

INDUSTRIAL APPLICABILITY

As described above, the method for removing water contained in a solid according to the present invention is suitable for removing water from a solid containing a large amount of water with reduced power, and in particular, it is a useful technology which can remove water strongly bonded to the functional group on the surface of coal such as brown coal and sub-bituminous coal with reduced power, achieving a water content level of bituminous coal.

Accordingly, combustibility and transportation cost equal to those of high-grade coal can be achieved even for brown coal and sub-bituminous coal, which are low in ash content and sulfur content but have been used only at mine mouth due to high water content which resulted in poor transportation cost and poor combustibility. From a comprehensive view including mining of coal and processing after power generation, the method is effective for the reduction of the cost of power generation. Needless to say, according to the present invention, highly efficient and power saving dewatering of a solid containing water other than coal such as brown coal, which is operable under extremely practical conditions of room temperature and about 0.5 MPa, can also be expected.

The invention claimed is:

1. A method for removing water contained in a solid using a liquefied material, comprising the steps of:

pressurizing a material D in at least one compressor, the material D being a gas at 25° C. under 1 atm. to produce a liquefied material D;

the pressurizing step including condensing the material D in a condenser that is linked to a vaporizer for heat exchange between the condenser and the vaporizer, so that a latent heat of evaporation of the material D is transferred to the vaporizer;

contacting a solid containing water with the liquefied material D;

allowing the liquefied material D to dissolve the water contained in the solid, and producing a liquefied material D having a high water content and simultaneously removing the water from the solid;

vaporizing the material D from the liquefied material D having a high water content in the vaporizer, to thereby separate the water from the resulting gaseous material D;

the vaporizing step including passing the material D to an expander that is operatively connected to the at least one compressor for expansion of the material D to create work in the expander that is transferred to the at least one compressor for at least partly powering the at least one compressor;

recovering the separated gaseous material D;

liquefying the recovered gaseous material by pressurizing, cooling or a combination thereof, to reuse the resulting liquefied material D for removing water from a solid containing water; and wherein the material D contains dimethyl ether.

2. The method according to claim 1, wherein the solid containing water is brown coal or sub-bituminous coal.

3. The method according to claim 1, wherein the liquefied material D contacts countercurrently with the solid containing water.

4. The method according to claim 1, wherein an amount of the liquefied material D which is brought into contact with the solid containing water is a theoretical amount.

5. The method according to claim 1, wherein a series of the steps thereof for removing water using the liquefied material D is carried out in a temperature range of 0 to 50° C.

6. A system for removing water from a solid containing water, comprising:
   a material D which is a gas at 25° C. under 1 atm.;
   a compressor for pressurizing the gaseous material D;
   a condenser for condensing the pressurized gaseous material D to produce a liquefied dimethyl ether;
   a dehydrator for dewatering by contacting the solid containing water with the liquefied material D to dissolve the water;
   a vaporizer for vaporizing the material D from the liquefied material D having the dissolved water;
   a separator for separating the vaporized material D and water;
   an expander for expanding the evaporated material D, all of which are sequentially connected in series;
   means connecting the expander to the compressor to form a circuit in which the material D circulates, for recovering work due to expansion of the material D in the expander and for introducing the work to the compressor for at least partly powering the compressor; and
   a heat exchanger linking the condenser and the vaporizer, so that a latent heat of evaporation of the material D is transferred to the vaporizer;
   wherein the material D contains dimethyl ether.

7. The system for removing water from a solid containing water according to claim 6, wherein the separator is connected to a deaerator for deaeration of the material D from water separated in the separator, and the degasifier is connected to the circuit so that the gasified material D is recovered and returned to the circuit.

8. The system for removing water from a solid containing water according to claim 6, wherein the dehydrator causes the liquefied material D to contact countercurrently with the solid containing water.

* * * * *